(12) United States Patent
Xu et al.

(10) Patent No.: US 8,676,888 B2
(45) Date of Patent: Mar. 18, 2014

(54) METHOD FOR MULTI-TERMINAL SESSION, AND COMMUNICATION SYSTEM AND RELATED DEVICE THEREOF

(75) Inventors: Guojun Xu, Shenzhen (CN); Xiaobo Wang, Shenzhen (CN)

(73) Assignee: Huawei Technologies Co. Ltd., Shenzhen (CN)

( * ) Notice: Subject to any disclaimer, the term of this patent is extended or adjusted under 35 U.S.C. 154(b) by 648 days.

(21) Appl. No.: 12/615,886

(22) Filed: Nov. 10, 2009

(65) Prior Publication Data

US 2010/0057853 A1 Mar. 4, 2010

Related U.S. Application Data

(63) Continuation of application No. PCT/CN2008/071815, filed on Jul. 30, 2008.

(30) Foreign Application Priority Data

Aug. 6, 2007 (CN) .......................... 2007 1 0140153

(51) Int. Cl.
G06F 15/16 (2006.01)
(52) U.S. Cl.
USPC ........... 709/204; 709/228; 709/224; 709/223; 370/338; 370/401; 370/352; 455/436
(58) Field of Classification Search
USPC .......... 709/204, 228, 224, 227, 223; 370/338, 370/401, 352; 455/436
See application file for complete search history.

(56) References Cited

U.S. PATENT DOCUMENTS

| | | | | |
|---|---|---|---|---|
| 2003/0023730 A1* | 1/2003 | Wengrovitz et al. | .......... | 709/227 |
| 2003/0224792 A1* | 12/2003 | Verma et al. | .................. | 455/436 |
| 2004/0249887 A1* | 12/2004 | Garcia-Martin et al. | ..... | 709/204 |
| 2005/0289237 A1* | 12/2005 | Matsubara et al. | ........... | 709/232 |
| 2007/0025301 A1* | 2/2007 | Petersson et al. | ............. | 370/338 |
| 2007/0066490 A1* | 3/2007 | Gemelos et al. | ............... | 505/100 |
| 2007/0118659 A1* | 5/2007 | Cuny et al. | .................... | 709/227 |
| 2007/0258440 A1* | 11/2007 | Watanabe | ..................... | 370/352 |
| 2008/0117922 A1* | 5/2008 | Cockrell et al. | ............. | 370/401 |
| 2008/0144621 A1* | 6/2008 | Huang et al. | .................. | 370/390 |

FOREIGN PATENT DOCUMENTS

| | | |
|---|---|---|
| CN | 1777155 A | 5/2006 |
| CN | 1842083 A | 10/2006 |
| KR | 20040028067 A | 4/2004 |

OTHER PUBLICATIONS

Office Action issued in corresponding Chinese Patent Application No. 200710140153.6, mailed May 6, 2011.
Office Action issued in corresponding Chinese Patent Application No. 200710140153.6 (including English translation and Verification of Translation), mailed May 6, 2011.

(Continued)

Primary Examiner — Thuong Nguyen
(74) Attorney, Agent, or Firm — Brinks Gilson & Lione

(57) ABSTRACT

A method for a multi-terminal session, and a communication system and related devices thereof are disclosed according to the present invention. Accordingly, the user experience is improved. The method of the present invention includes setting up a connection between each terminal of a multi-terminal user and a session transfer server; setting up a connection between the session transfer server and a peer user; conducting a session between each terminal of the multi-terminal user and the peer user via the session transfer server.

8 Claims, 10 Drawing Sheets

(56) References Cited

OTHER PUBLICATIONS

Granted Claims in corresponding Chinese Patent Application No. 200710140153.6 (including English translation and Verification of Translation).

Johnston, A. et al. "Session Initiation Protocol (SIP) Call Control—Conferencing for User Agents" The Internet Society. Aug. 2006.

Mahy, R. et al. "A Call Control and Multi-Party Usage Framework for the Session Initiation Protocol (SIP) draft-ietf-sipping-cc-framework-07.txt." Internet Engineering Task Force. Mar. 4, 2007.

Written Opinion of the International Searching Authority issued in corresponding PCT Application No. PCT/CN2008/071815; mailed Nov. 13, 2008.

Supplementary European Search Report issued in corresponding European Patent Application No. 08783808.2; issued Aug. 26, 2010.

* cited by examiner

METHOD FOR MULTI-TERMINAL SESSION, AND COMMUNICATION SYSTEM AND RELATED DEVICE THEREOF

CROSS-REFERENCE TO RELATED APPLICATIONS

This application is a continuation of International Application No. PCT/CN2008/071815, filed Jul. 30, 2008, which claims priority to Chinese Patent Application No. 200710140153.6, filed Aug. 6, 2007. The disclosure of the above applications is incorporated herein by reference in their entireties.

FIELD OF THE INVENTION

The present invention relates to communication fields, and more specifically, to a method for multi-terminal session, and communication system and related device thereof.

BACKGROUND

With evolution of the messaging system, end users, in practice, may use a plurality of terminals to log on the messaging service system. For instance, the user may use a Personal Computer (PC), a Personal Digital Assistant (PDA) or a cell phone, etc.

A conventional method for realizing a multi-terminal session is described below.

First, two parties in communication use an INVITE command to set up a session and negotiate media information to be used in the session. Then, the media information is interacted in accordance with the negotiated media capability. Lastly, a BYE command is used to terminate the session. If one party or the two parties has multiple terminals to join in the session, this situation is handled by a Globally Routable User Agent Uniform resource identifier (GRUU).

Specifically, a public URI carries a "gr" parameter. This parameter is generated using a device ID, such as MAC address of the terminal, at the time when the terminal is being registered on line. URI plus "gr" gets GRUU. When GRUU is adopted, routing entities and service entities in the network are all required to support GRUU, which may ensure a correct routing to a specific terminal. If GRUU is not supported, "gr" parameter is neglected during the processing. When both parties support GRUU, multiple terminals can be switched to one another or simultaneously join the session.

It is discovered, during the process of this invention, a user B is able to identify each terminal of user A using a plurality of terminals. For instance, when terminal 1 of user A is communicating with user B and terminal 2 of user A requests to join the session, the session between terminal 1 of user A and user B will be disconnected first, and a conference is set up. Terminal 2 of user A, terminal 1 of user A and user B will join the conference to conduct a session. Therefore, the conventional method for multi-terminal session treats each terminal of a multi-terminal user as a single entity. When multiple terminals are participating the session, the session might probably be disconnected in order to set up a conference, which may deteriorate the user experience.

SUMMARY

A method for a multi-terminal session, and a communication system and a related device thereof are disclosed according to various embodiment of the present invention. Accordingly, the user experience is improved.

The method for a multi-terminal session according to one embodiment of the present invention includes: setting up a connection between each terminal of a multi-terminal user and a session transfer server; setting up a connection between the session transfer server and a peer user; conducting a session between each terminal of the multi-terminal user and the peer user via the session transfer server.

A communication system according to one embodiment of the present invention includes: a peer user, configured to conduct a session and set up a connection with a session transfer server; a multi-terminal user, configured to conduct a session with the peer user via the session transfer server; the session transfer server, configured to set up a connection between each terminal of the multi-terminal user and the session transfer server and set up a connection with the peer entity and represent each terminal of the multi-terminal user to conduct a session with the peer user.

The session transfer server according to one embodiment of the present invention includes: a connection setup unit, configured to set up a session connection with each terminal of two users in communication via a Session Initialization Protocol message; a channel setup unit, configured to set up a transport protocol channel with each terminal of the two users in communication; a session agent unit, configured to receive a media message from a peer user, send the media message to a corresponding terminal of the multi-terminal user, receive media message from each terminal of the multi-terminal user, and send the media message to the peer user.

As can be seen from the above description, the embodiment of the present invention embraces the following technical effects.

According to the embodiments of the present invention, a connection between each terminal of the multi-terminal user and a session transfer server is first set up. A connection between the session transfer server and the peer user is set up. Then, each terminal of the multi-terminal user conducts a session with the peer user via the session transfer server. Consequently, the session transfer server represents the multi-terminal user to conduct a session with the peer user. Therefore, the peer user will not be notified when the multi-terminal user switches a terminal or adds a terminal. As such, there is no need to set up a session site, thus the continuity of the session is maintained and the user experience is improved.

DETAILED DESCRIPTION

A method for a multi-terminal session, and a communication system and related devices thereof are disclosed according to various embodiment of the present invention. Accordingly, the user experience is improved.

According to one embodiment of the present invention, a Session Transfer Server (STS) is used to represent a multi-terminal user to conduct a session with a peer user. Therefore, the peer user will not be notified when the multi-terminal user switches a terminal or adds a terminal. As such, there is no need to set up a conference between the multi-terminal user and the peer user, thus the continuity of the session is maintained and the user experience is improved.

Figure 1:
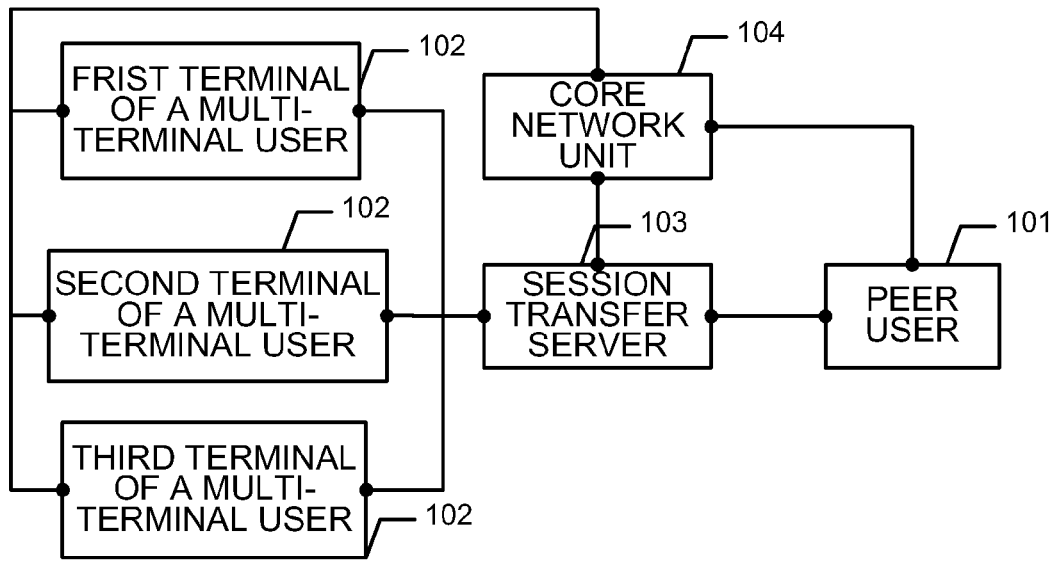
FIG. 1 is a schematic diagram of a communication system according to one embodiment of the present invention.

A system architecture according to one embodiment of the present invention will be discussed first. Referring to FIG. 1, a communication system according to one embodiment of the present invention may include:

a peer user 101, configured to conduct a session and set up a connection with a session transfer server 103;

a multi-terminal user 102, configured to conduct a session with the peer user via the session transfer server 103;

the session transfer server 103, configured to set up a connection between each terminal of the multi-terminal user 102 and the session transfer server 103, set up a connection with the peer user 101, and conduct a session with the peer user 101 as an agent of each terminal of the multi-terminal user 102;

a core network unit 104, configured to forward messages between the peer user 101, the multi-terminal user 102 and the session transfer server 103.

In this embodiment, the session transfer server 103 may be integrated in a local server or a home server.

In this embodiment, the core network unit 104 may be an SIP/IP core network.

The operation of each unit in the present embodiment will be described below in accordance with application scenarios.

1. Session Setup Procedure

The peer user 101 sends a session invitation request to the session transfer server 103 via the core network unit 104, inviting the multi-terminal user 102 to join the session. After the session transfer server 103 determines that the multi-terminal user 102 is configured with a multi-terminal session, the session transfer server 103 sends the session invitation request to each terminal of the multi-terminal user 102 which has been registered on line. After receiving feedbacks from each terminal of the multi-terminal user 102, the session transfer server 103 sets up a transport channel with the peer user 101 and transport channels between the session transfer server 103 and each terminal of the multi-terminal user 102.

It is appreciated that a certain terminal of the multi-terminal user 102 is also able to send a session invitation request to the session transfer server 103. After the session transfer server 103 receives the session invitation request, the session transfer sever 103 forwards the session invitation request to the peer user 101 or sends the request to other terminals of the multi-terminal user 102.

The transport channel in the present embodiment may be a Real-Time Transport Protocol (RTP) transport channel. It is appreciated that other protocols, e.g., Message Session Relay Protocol (MSRP), may also be adopted for media interaction.

In this embodiment, the core network unit 104 functions to forward data.

2. Session Terminal Adding Procedure

A first terminal of the multi-terminal user 102 sends a terminal join request to the session transfer server 103 via the core network unit 104, inviting a second terminal of the multi-terminal user 102 to join the current session. The session transfer server 103 sends the session invitation request to the second terminal of the multi-terminal user 102 via the core network unit 104. After receiving a feedback from the second terminal of the multi-terminal user 102, the session transfer server 103 sets up a transport channel with the second terminal of the multi-terminal user 102.

The transport channel in the present embodiment may be an RTP channel or MSRP channel.

3. Session Terminal Removal Procedure

A first terminal of the multi-terminal user 102 sends a terminal removal request to the session transfer server 103 via the core network unit 104, requesting to remove a second terminal of the multi-terminal user 102 from the current session. The session transfer server 103 sends a session termination request to the second terminal of the multi-terminal user 102 via the core network unit 104 so as to terminate the session with the second terminal of the multi-terminal user 102.

Alternatively, a first terminal of the multi-terminal user 102 sends a session termination request to the session transfer server 103 via the core network unit 104, requesting to leave the current session. The session transfer server 103 feeds back a session termination acknowledgement to the first terminal of the multi-terminal user 102 via the core network unit 104 so as to disconnect the connection with the first terminal of the multi-terminal user 102.

4. Session Terminal Switching Procedure

A first terminal of the multi-terminal user 102 sends a terminal replacing request to the session transfer server 103 via the core network unit 104, inviting a second terminal of the multi-terminal user 102 to replace the first terminal to join the current session. The session transfer server 103 sends a session invitation request to the second terminal of the multi-terminal user 102 via the core network unit 104. After receiving a feedback from the second terminal of the multi-terminal user 102, the session transfer server 103 sets up a transport channel with the second terminal of the multi-terminal user 102 and sends a session termination request to the first terminal of the multi-terminal user 102. After receiving the feedback from the first terminal of the multi-terminal user 102, the session transfer server 103 disconnects the connection with the first terminal of the multi-terminal user 102.

The transport channel in the present embodiment may be an RTP channel or MSRP channel.

The functions of each unit in the present embodiment have been described in accordance with the four specific scenarios. In practice, there may be more scenarios, which will not be described for brevity.

Figure 2:
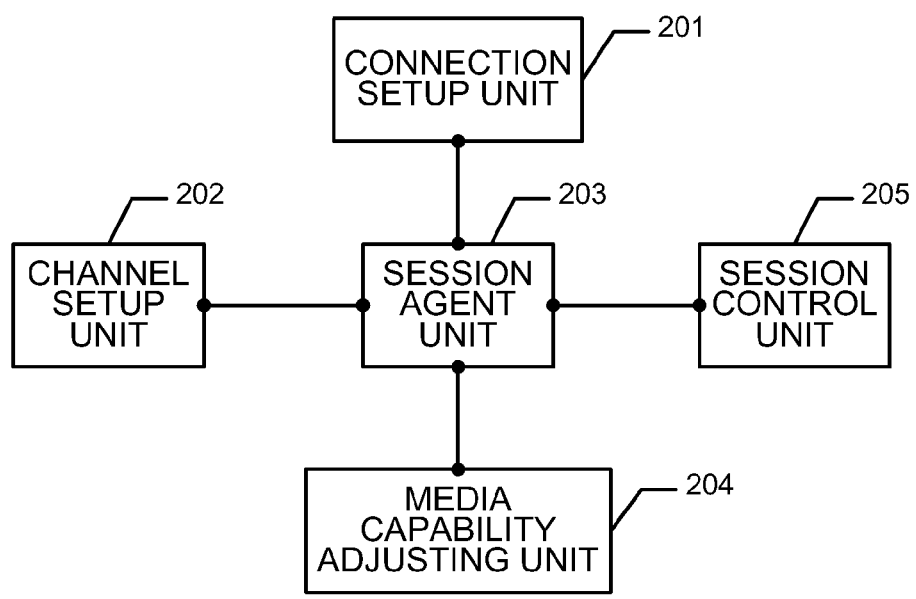
FIG. 2 is a schematic diagram of a session transfer server according to one embodiment of the present invention.

Referring to FIG. 2, the session transfer server according to one embodiment of the present invention may include:

a connection setup unit 201, configured to set up a session connection with each terminal of two users via a Session Initialization Protocol message;

a channel setup unit 202, configured to set up a real-time transport protocol channel with each terminal of the two users via a real-time transport protocol message;

a session agent unit 203, configured to receive a media message from a peer user, send the media message to a corresponding terminal of the multi-terminal user, receive media messages from each terminal of the multi-terminal user, and send the media messages to the peer user;

a media capability adjusting unit 204, configured to perform a media negotiation with each terminal of the multi-terminal user and adjust the media capability of the session transfer server according to the negotiation result;

a session control unit 205, configured to receive a session control request sent from a peer user or from a multi-terminal user and perform a session control operation in response to the session control request.

The session control request may include a terminal join request, a session termination request, or a session modification request, etc.

Functions of each unit in the session transfer server according to one embodiment of the present invention are described below in connection with a session setup scenario as an example.

The session control unit 205 receives a session invitation request from the peer user. The session invitation request invites the first terminal of the multi-terminal user and the second terminal of the multi-terminal user to join the session. The session control unit 205 sends a session invitation request to the first terminal of the multi-terminal user and the second terminal of the multi-terminal user via the connection setup unit 201. After receiving the feedbacks from the first terminal of the multi-terminal user and the second terminal of the multi-terminal user, the session control unit 205 informs the media capability adjusting unit 204 and the channel setup unit 202. The media capability adjusting unit 204 acquires the media capability of each terminal of the multi-terminal user and regards the sum of the media capabilities as the media capability of the session transfer server. The channel setup unit 202 sets up an RTP transport channel with the peer user via an RTP message and sets up an RTP transport channel with each terminal of the multi-terminal user. Then, the session agent unit 203 receives a media message from the peer user, forwards the media message to a certain terminal of the multi-terminal user according to the media capability information, and receives media messages from each terminal of the multi-terminal user and forwards the media messages to the peer user.

According to one embodiment of the present invention, a Session Transfer Server (STS) is used to represent a multi-terminal user to conduct a session with a peer user. Therefore, the peer user will not be notified when the multi-terminal user switches a terminal or adds a terminal. As such, there is no need to set up a session site, thus the continuity of the session is maintained and the user experience is improved.

Embodiments of the method for multi-terminal session can be categorized into three types in accordance with different STS setup methods.

I. Set Up an STS in Accordance with a Preset Rule.

In this embodiment, multi-terminal user pre-determines whether or not to conduct a multi-terminal session. If a multi-terminal session is configured, a service server may set up a session transfer server to implement a multi-terminal media distribution function when the user starts a session with other user.

This solution is categorized into two types based on the calling/called party of the multi-terminal user.

A. The Multi-Terminal User is a Called Party.

Figure 3:
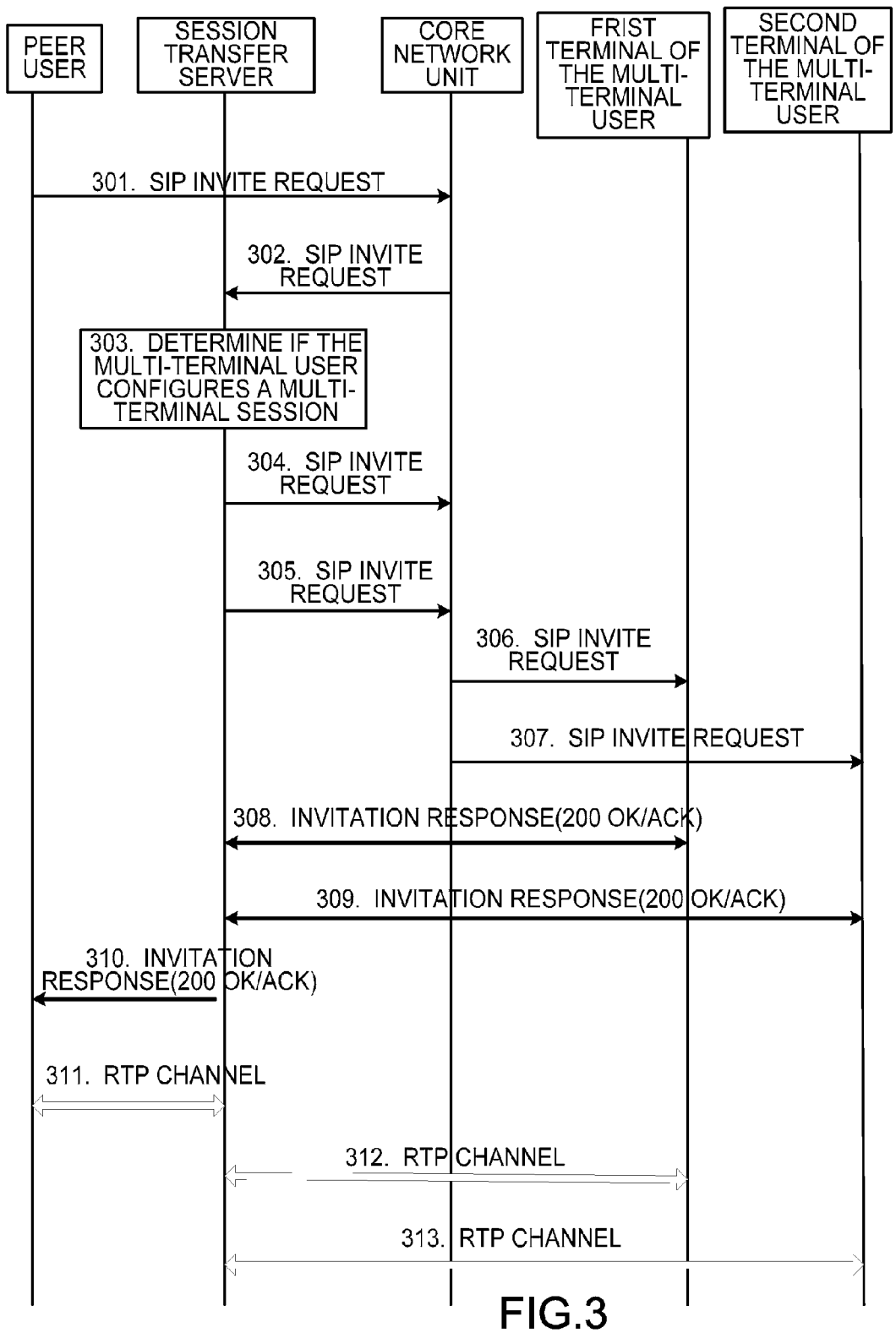
FIG. 3 is a first flowchart of a session setup procedure according to a method for multi-terminal session of the present invention.

Referring to FIG. 3, a first embodiment of a session setup procedure according to the method for multi-terminal session of the present invention includes the following steps.

301: A peer user sends an SIP INVITE request to a core network unit.

In this embodiment, the peer user may be a single-terminal user. The core network unit is the core network of the Session Initialization Protocol signaling. In this embodiment, the users participating in the session and a local server belong to a same home network. The local server is a home server for the multi-terminal user.

In this embodiment, the peer user sends an SIP INVITE request to invite a multi-terminal user to join the session.

302: The core network unit forwards the SIP INVITE request to the local server.

After receiving the SIP INVITE request, the core network unit sends the SIP INVITE request to the local server according to target parameters carried in the SIP INVITE request.

303: The local server determines if a multi-terminal session is configured.

After receiving the SIP INVITE request, the local server checks configuration information of the multi-terminal user stored locally. If the multi-terminal user configures a multi-terminal session, then the STS is utilized to serve the session. If the multi-terminal user does not configure the multi-terminal session, then the procedure follows a conventional process.

304~307: Request to join the session.

The STS sends an SIP INVITE request to each terminal of the multi-terminal user registered on line (a first terminal and a second terminal in this embodiment), inviting the first terminal and the second terminal to join the session. The SIP INVITE request is sent to the first terminal and the second terminal via the core network unit.

In the embodiment, the multi-terminal user has two terminals registered on line. It can be understood that the multi-terminal user may have multiple terminals registered on line. The specific procedure is similar to the procedure with two terminals and is omitted for brevity.

308~309: The first terminal and the second terminal response to the SIP INVITE request.

The first terminal and the second terminal receive the request respectively and return an SIP 200 OK response which is an invitation acknowledgement message. The STS sends an ACK response to the first terminal and the second terminal such that the first terminal and the second terminal may join the session.

310: The STS returns an invitation response to the peer user.

The STS feeds back an SIP 200 OK response to the peer user. The peer user returns an ACK response to the STS so that the peer user may join the session.

311~313: A media transport channel is set up.

For the peer user, the first terminal and the second terminal of the multi-terminal user conduct, respectively, a media interaction with the STS by way of a Real-Time Transport Protocol channel. It is appreciated that in addition to RTP protocol for the media interaction, other protocols, such as MSRP, may be used to conduct media interaction in the present embodiments and the accompanying embodiments.

In the present embodiment, the STS sets up RTP channels with the peer user, the first terminal of the multi-terminal user and the second terminal of the multi-terminal user via RTP messages respectively. The RTP message carries channel setup information such as a source address, a target address, a type supported for data transmission. The RTP channel can be set up based on the information.

When the first terminal of the multi-terminal user and the second terminal of the multi-terminal user join the session, these terminals perform media capability negotiation with the STS, respectively, so as to determine the media which can be transferred and received. At the same time, the STS extracts a maximum media capability after the negotiation of two terminals. The maximum media capability serves as the media capability of the multi-terminal user to conduct media negotiation with the peer user.

B. The Multi-Terminal User is a Calling Party.

Figure 4:
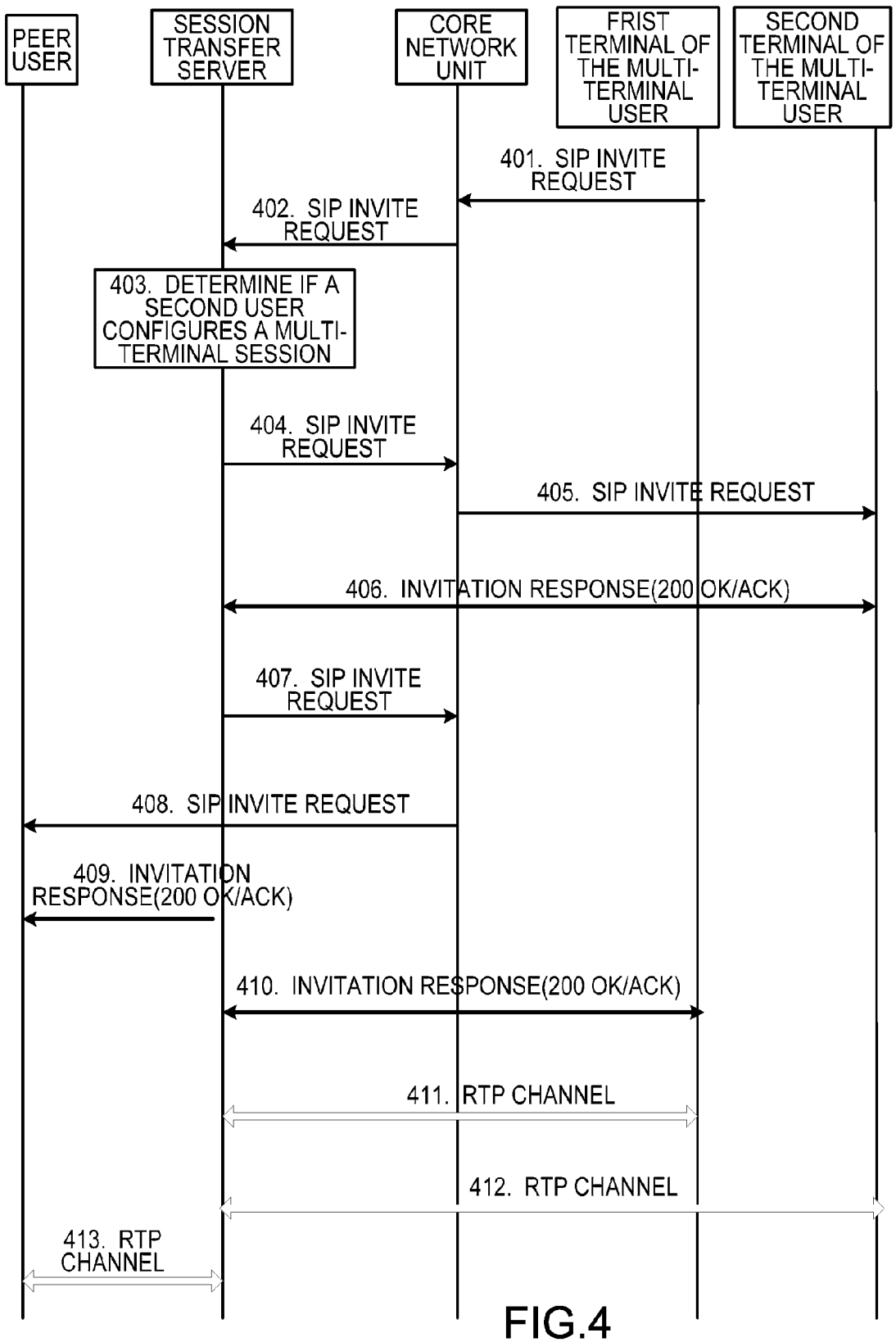
FIG. 4 is a second flowchart of a session setup procedure according to a method for multi-terminal session of the present invention.

FIG. 4 is a second embodiment of a session setup procedure according to a method for multi-terminal session of the present invention.

401: An SIP INVITE request is sent.

The first terminal of the multi-terminal user sends an SIP INVITE request to the core network unit, inviting the peer user to join the session. It is appreciated that other terminals of the multi-terminal user can also send the SIP INVITE request.

In this embodiment, if it is the first terminal of the multi-terminal user that sends the SIP INVITE request, the SIP INVITE request may carry URI of the peer user and the GRUU of the second terminal of the multi-terminal user.

It can be understood that if the multi-terminal user has only two terminals and if the first terminal sends an SIP INVITE request, the STS may add the second terminal into the terminal by default. In this case, the SIP INVITE request may not contain GRUU of the second terminal.

402: The core network unit forwards the SIP INVITE request to the local server.

After receiving the SIP INVITE request, the core network unit sends the request to the local server according to the target parameters carried in SIP INVITE the request.

403: If a multi-terminal session is configured is determined

After receiving the SIP INVITE request, the local server checks configuration information of the multi-terminal user stored locally. If the multi-terminal user configures a multi-terminal session, then the STS is utilized to serve the session. If the multi-terminal user does not configure the multi-terminal session, then the procedure follows a conventional process.

404~405: The STS invites other terminal to join the session.

The STS sends an SIP INVITE request to another terminal, i.e., a second terminal of the multi-terminal user registered on line, inviting the second terminal to join the session. The SIP INVITE request is sent to the second terminal via the core network unit.

406: The second terminal joins the session.

The second terminal receives the invitation and returns an SIP 200 OK response, i.e., invitation acknowledge, to the STS, so that the second terminal may join the session.

407~408: The peer user is invited to join the session.

The STS sends an SIP INVITE request to the peer user, inviting the peer user to join the session. The SIP INVITE request is sent to the peer user via the core network unit.

409: The peer user joins the session.

The peer user receives the invitation and returns an SIP 200 OK response to the STS. The STS returns an ACK response to the peer user so that the peer user may join the session.

410: A first terminal of the multi-terminal user is invited to join the session.

The STS returns an SIP 200 OK response to the first terminal of the multi-terminal user. The first terminal returns an ACK response to the STS so that the first terminal may join the session.

411~413: Media transport channels are set up.

The peer user, the first terminal of the multi-terminal user and a second terminal of the multi-terminal user set up RTP channels with the STS respectively and conduct a media interaction.

The procedure of setting up a RTP channel is similar to the procedure in the pervious embodiment.

When the first terminal of the multi-terminal user and the second terminal of the multi-terminal user join the session, these terminals perform media capability negotiation with the STS, respectively, so as to determine the media which can be transferred and received. At the same time, the STS extracts a maximum media capability after the negotiation of two terminals. The maximum media capability serves as the media capability of the multi-terminal user to conduct media negotiation with the peer user.

Regarding two users in the session of the above embodiment, one is a single-terminal user, and another is a multi-terminal user. As can be understood, it is also possible that two multi-terminal user may conduct a session provided that two multi-terminal users set up their respective STS and communicate between two STSs. The similar procedure will not be repeated for brevity.

In the above embodiment, two situations are described where the multi-terminal user is a calling party and called party. A session control procedure after the session is setup is now described below.

First, a procedure of a terminal joining a session is introduced. In the embodiment, a second terminal of the multi-terminal user requests to join the session when the peer user is conducting a session with a first terminal of the multi-terminal user.

Figure 5:
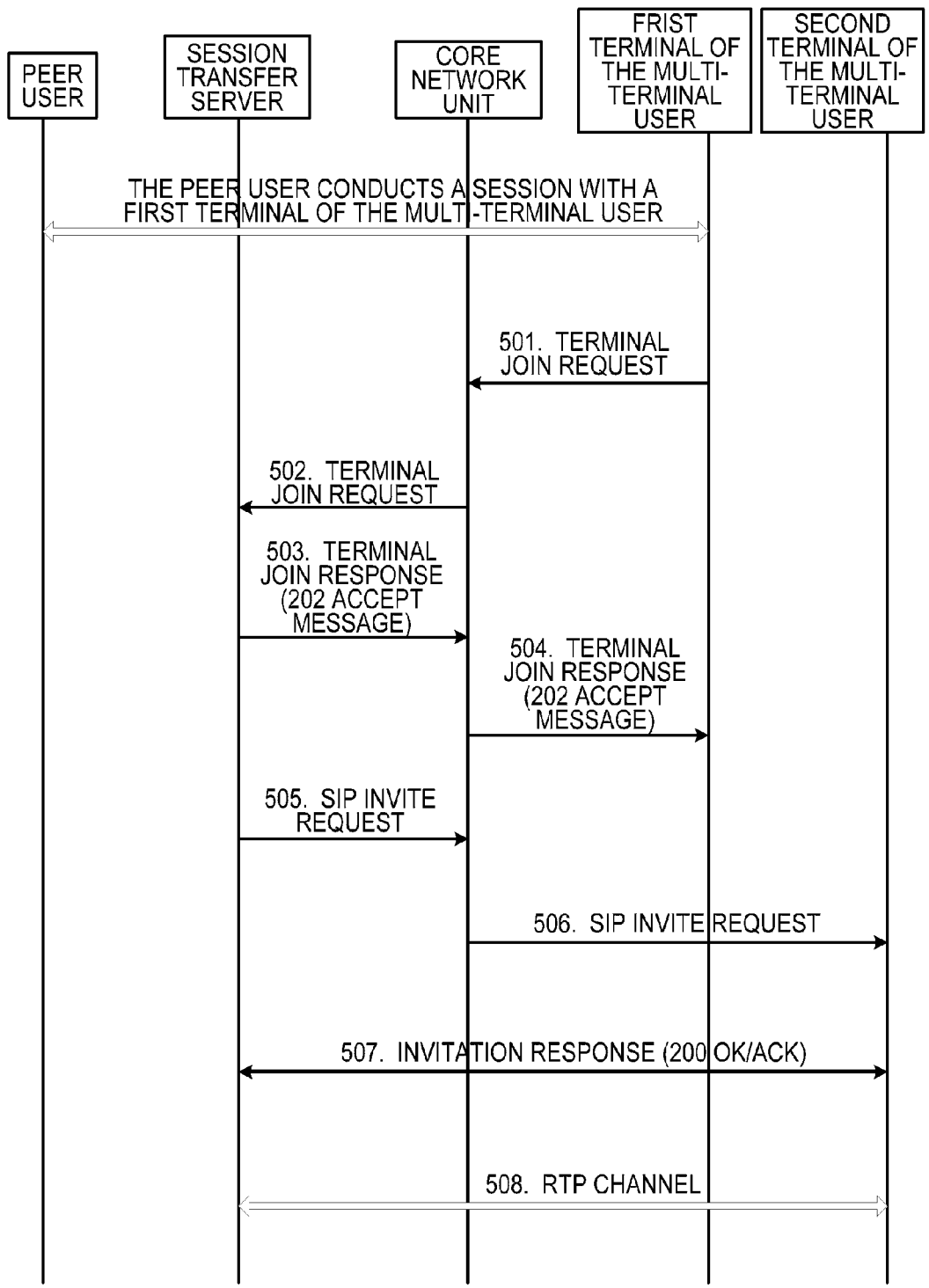
FIG. 5 is a first flowchart of a terminal adding procedure according to a method for multi-terminal session of the present invention.

Referring to FIG. 5, a terminal joining procedure according to a method for multi-terminal session of the present invention includes the following steps.

501: The first terminal of the multi-terminal user sends an SIP REFER request to a core network unit.

502: The core network unit forwards the SIP REFER request.

In this embodiment, the content requested by the SIP REFER is to invite the second terminal of the multi-terminal user to join a session and the SIP REFER request may specify the media type to be used. In the embodiment, a terminal join request as an example of the SIP REFER request is explained. As can be understood, other types of messages may also be conceived.

If a media type is required to be specified, a field parameter for a Refer-To header needs to be extended so that the field parameter may carry a media parameter of Session Description Protocol (SDP) carried by the SIP INVITE request. In one embodiment, the Refer-To is given below.

Refer-To: <"sip:b@example.com; gr=urn:uuid:f81d4fae-7dec-11d0-a765-00a0c91e6bf6?method=INVITE?m=Audio/>

As can be seen that the method for indicating parameter contained in the Refer-To header is to employ an INVITE field. The media parameter of SDP carried in the INVITE field is Audio.

According to the embodiment, the header contains the media parameter of SDP carried in the SIP INVITE request. It is understood that the parameter may also be carried in an SIP REFER message body.

503~504: The SIP REFER request is responded to.

After the STS receives the SIP REFER request, the STS returns an SIP 202 Accepted response to the first terminal, i.e., terminal join acknowledgement. The response is sent to the first terminal via the core network unit.

505~506: Invite to join the session.

After the STS receives an SIP REFER request, the STS sends an SIP INVITE request to the second terminal, inviting the second terminal to join the session. The SIP INVITE request is sent to the second terminal via the core network unit.

507: The second terminal joins the session.

The second terminal receives the invitation and returns an SIP 200 OK response to the STS. The STS returns an SIP ACK response to the second terminal so that the second terminal may join the session.

508: The second terminal sets up an RTP channel with the STS to conduct a media interaction.

The procedure of setting up an RTP channel is similar to the procedure in the pervious embodiment.

When the first terminal of the multi-terminal user and the second terminal of the multi-terminal user join the session, these terminals perform media capability negotiation with the STS, respectively, so as to determine the media which can be transferred and received. At the same time, the STS extracts a maximum media capability after the negotiation of two terminals. The maximum media capability serves as the media capability of the multi-terminal user to conduct media negotiation with the peer user.

A media update procedure is introduced below. In the embodiment, the peer user requests to update a media type when the peer user is conducting a session with a first terminal of the multi-terminal user.

Figure 6:
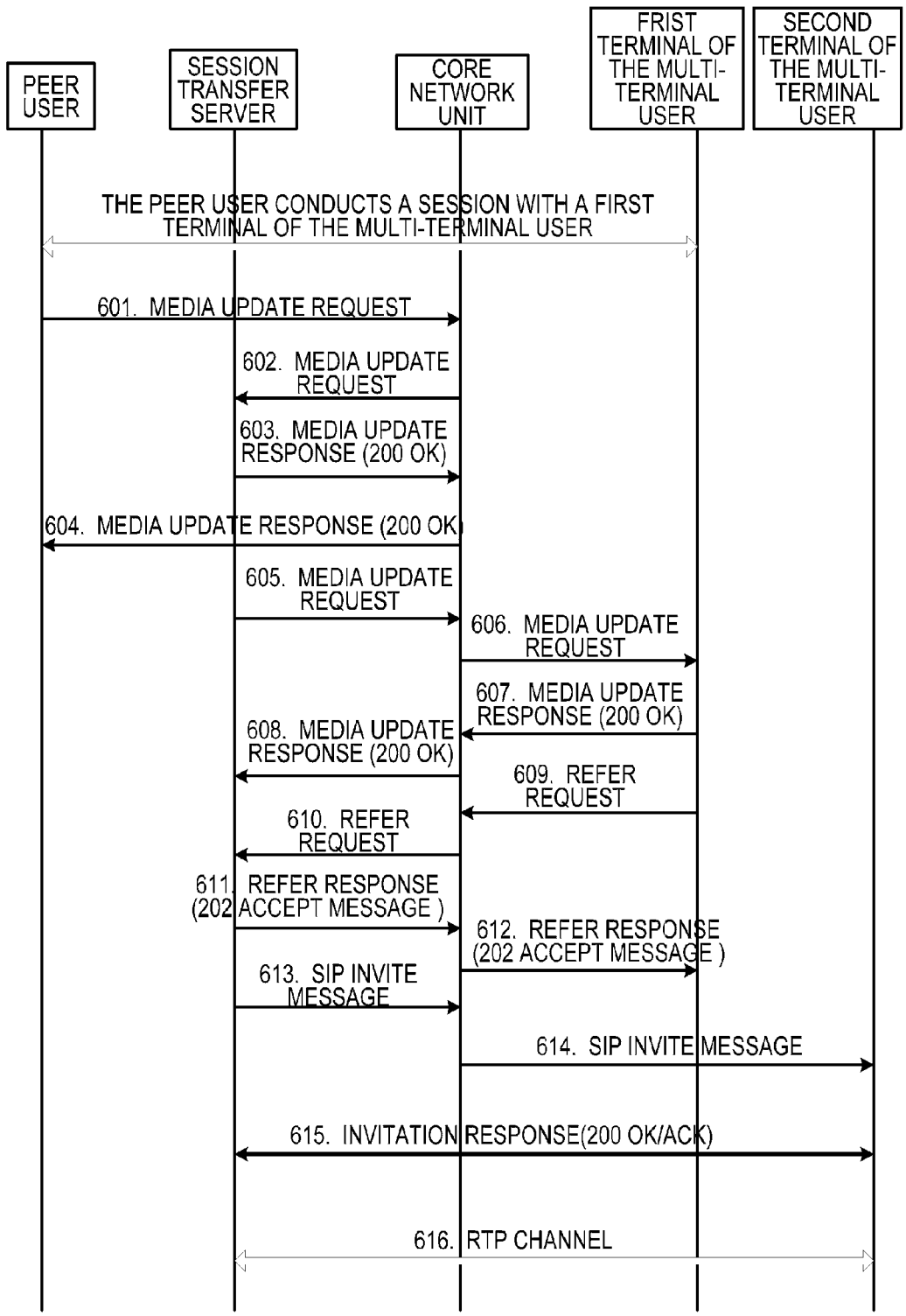
FIG. 6 is a flowchart of a media update procedure according to a method for multi-terminal session of the present invention.

Referring to FIG. 6, a media update procedure according to a method for multi-terminal session of the present invention includes the following steps.

601: A peer user sends an UPDATE request to a core network unit.

602: The core network unit forwards the UPDATE request.

In this embodiment, the UPDATE request contains an update media type requested by the peer user.

603~604: The STS responds to the UPDATE request.

After the STS receives the UPDATE request, the STS returns an SIP 200 OK response to the first terminal. The response is sent to the peer user through the core network unit.

605~606: The STS forwards the media type to the first terminal.

After the STS receives the UPDATE request, the STS forwards the message to the first terminal.

607~612: The supporting type is queried.

A terminal which can support the updated media type is selected. In this embodiment, assume the second terminal of the multi-terminal user supports the updated media type.

Specifically, after the multi-terminal user receives the UPDATE request, the multi-terminal user may obtain media capability information of each terminal and determines if there is any terminal which can support the media type carried in the UPDATE request. In the embodiment, assume that the second terminal of the multi-terminal user can support the media type carried in the UPDATE request.

After the second terminal supporting the media type is found, a REFER message is sent to the STS via the core network unit. The message carries an ID of the second terminal, requesting the STS to add the second terminal into the session.

613~615: The second terminal is invited to join the session.

The STS invites the second terminal supporting update media type to join the current session. Specifically, the STS sends an SIP INVITE request to the second terminal according to the ID of the second terminal in the received REFER message. The subsequent response procedure and the session join procedure are similar to the procedure of inviting to join the session according to the previous embodiment.

616: The second terminal sets up an RTP channel with the STS to conduct a media interaction.

A terminal removal procedure is introduced below. The procedure may include the following two situations.

A: The First Terminal Requests to Remove Other Terminal.

In this embodiment, the first terminal of the multi-terminal user requests to remove the second terminal of the multi-terminal user when the peer user is conducting a session with the first terminal and the second terminal of the multi-terminal user.

Figure 7:
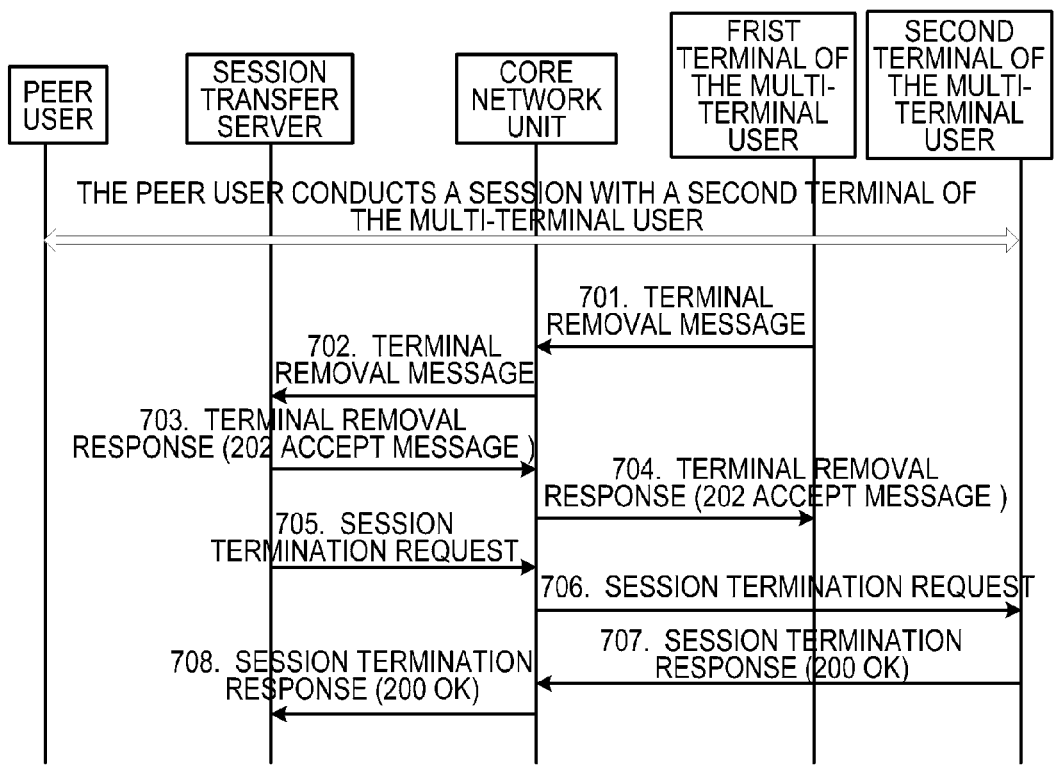
FIG. 7 is a first flowchart of a terminal removal procedure according to a method for multi-terminal session of the present invention.

Referring to FIG. 7, a first embodiment of a terminal removal procedure according to a method for multi-terminal session of the present invention includes the following steps.

701~702: The first terminal requests to remove the second terminal.

The first terminal initiates an SIP REFER request via the core network unit to the STS. The content requested by the SIP REFER is to request the second terminal to leave the session. The SIP REFER request contains an ID of the second terminal. In the embodiment, a terminal removal request as an example of the SIP REFER request is explained. As can be understood, other types of messages may also be conceived.

703~704: The STS feeds back a message.

After the STS receives the SIP REFER request, the STS returns an SIP 202 Accepted response to the first terminal, i.e., terminal removal acknowledgement. The response is sent to the first terminal through the core network unit.

705~706: The second terminal is requested to leave the session.

After the STS receives an SIP REFER request, the STS sends an SIP BYE request to the second terminal according to the ID of the second terminal in the SIP REFER request, requesting the second terminal to leave the session. The SIP BYE request is sent to the second terminal via the core network unit.

707~708: The second terminal leaves the session.

The second terminal receives the SIP BYE request and returns an SIP 200 OK response to the STS and leaves the session.

When the second terminal leaves the session, the STS extracts the negotiated media capability of the second terminal and modifies its own media capability accordingly based on the negotiated media capability of the peer user. After modification, media negotiation with the peer user can be performed again upon request in order to reduce part of the media capability of the second terminal.

B: The Second Terminal Requests to Remove Itself.

In the embodiment, the second terminal itself requests to leave the session when the peer user is conducting a session with the first and second terminals of the multi-terminal user.

Figure 8:
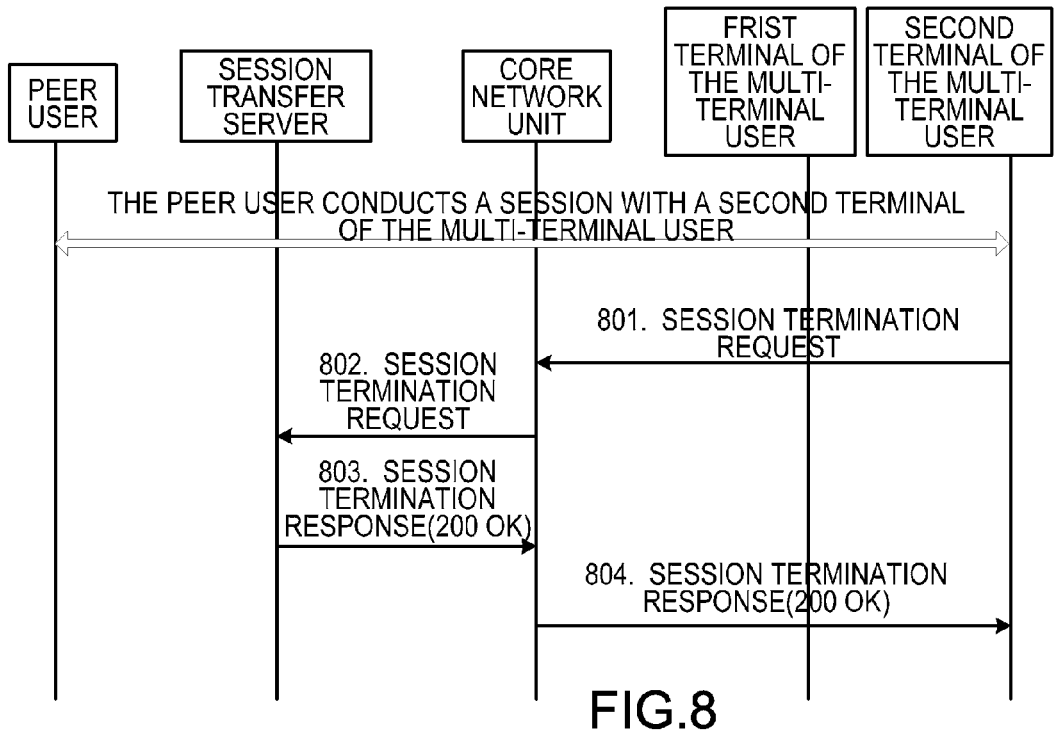
FIG. 8 is a second flowchart of a terminal removal procedure according to a method for multi-terminal session of the present invention.

Referring to FIG. 8, a second embodiment of a terminal removal procedure according to a method for multi-terminal session of the present invention includes the following steps.

801~802: Request to leave the session.

The second terminal initiates an SIP BYE request and sends the request to the STS via the core network unit. The SIP BYE request contains a session termination identifier, indicating that the second terminal itself requests to leave the current session.

803~804: The second terminal leaves the session.

After receiving the SIP REFER request, the STS returns an SIP 200 OK response to the second terminal. The SIP 200 OK response is sent to the second terminal through the core network unit so that the second terminal may leave the session.

When the second terminal leaves the session, the STS extracts the negotiated media capability of the second terminal and modifies its own media capability accordingly based on the negotiated media capability of the peer user. After modification, media negotiation with the peer user can be performed again upon request in order to reduce part of the media capability of the second terminal.

A terminal switching procedure is introduced below. In the embodiment, a second terminal of the multi-terminal user requests to replace the first terminal to conduct the session when the peer user is conducting a session with a first terminal of the multi-terminal user.

Figure 9:
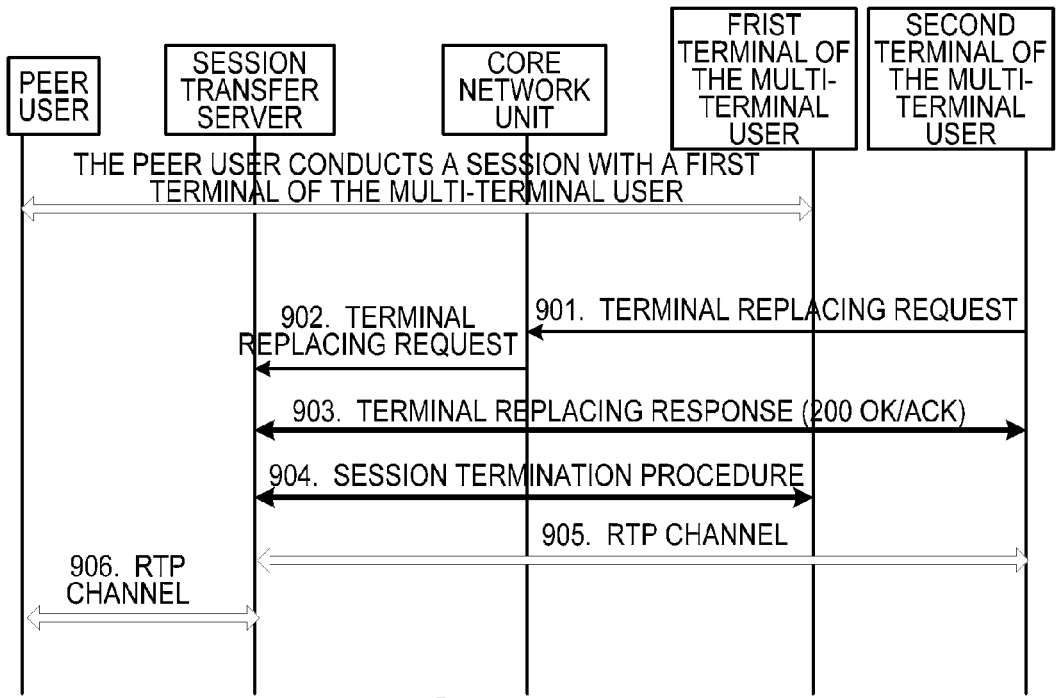
FIG. 9 is a flowchart of a terminal switching procedure according to a method for multi-terminal session of the present invention.

Referring to FIG. 9, a terminal switching procedure according to a method for multi-terminal session of the present invention includes the following steps.

901~902: The second terminal initiates a replacement request.

The second terminal initiates an SIP INVITE request containing a REPLACE header. The request is sent to the STS via the core network unit. The content requested by the SIP INVITE is to request the second terminal to replace the first terminal to join the session.

The content contained in the INVITE request of the present embodiment is different from the content contained in the INVITE request according to the first embodiment of the method for multi-terminal session. The INVITE request in the present embodiment is aimed at terminal replacement.

That is, in the present embodiment, the second terminal of the multi-terminal user sends an SIP INVITE request to the STS. However, the header in the request is REPLACE, i.e., requesting the second terminal of the multi-terminal user to replace the first terminal of the multi-terminal user to join the current session. In the present embodiment, a SIP INVITE request having REPLACE header is explained as an example for a second invitation request.

903: The STS feeds back a response.

After the STS receives the SIP INVITE request, the STS returns an SIP 200 OK response to the second terminal, i.e., a second invitation acknowledgement. The second terminal sends an SIP ACK response to the STS.

904: The first terminal leaves the session.

The STS sends an SIP BYE request to the first terminal, requesting the first terminal to leave the session. The SIP BYE request is sent to the first terminal via the core network unit.

The first terminal receives the SIP BYE request, returns an SIP 200 OK response and leaves the session.

905~906: The second terminal replaces to join the session.

The peer user and the second terminal of the multi-terminal user set up RTP channels with the STS respectively and conduct a media interaction.

When the second terminal joins the session, the STS extracts the negotiated media capability of the second terminal and modifies its own media capability accordingly based on the negotiated media capability of the first terminal.

When the first terminal leaves the session, the STS extracts the negotiated media capability of the first terminal and modifies its own media capability accordingly based on the negotiated media capability of the second terminal.

After the switching is done, media negotiation with the peer user can be performed again upon request and conducts the negotiation with the peer user based on the current media capability of the STS.

It is understood that the first terminal of the multi-terminal user can also initiate the switching procedure. The first terminal sends an SIP REFER request to the STS. A target URI carried in the "Refer to" header points to the second terminal. The method is to employ an SIP INVITE message. The SIP INVITE carries header REPLACE, instructing to replace the STS to conduct a session with the first terminal.

A session termination procedure is introduced below. In the embodiment, the peer user requests to terminate the session when the peer user is conducting a session with the second terminal of the multi-terminal user.

Figure 10:
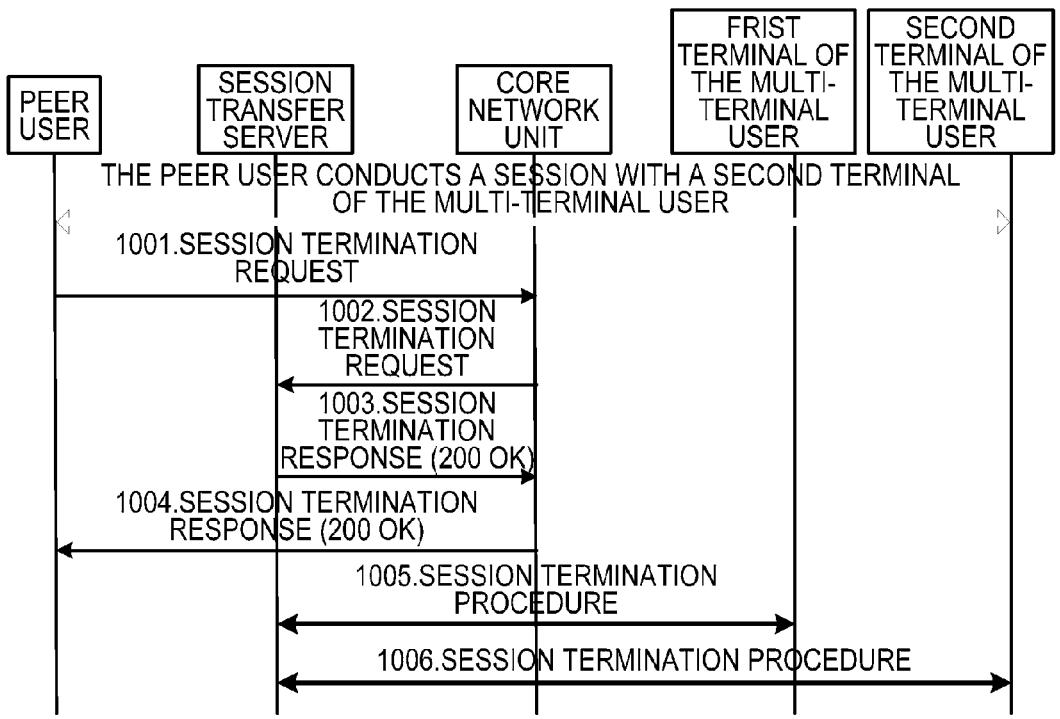
FIG. 10 is a flowchart of a session termination procedure according to a method for multi-terminal session of the present invention.

Referring to FIG. 10, a session termination procedure according to a method for multi-terminal session of the present invention includes the following steps.

1001~1002: The peer user sends a session termination request.

The peer user sends an SIP BYE request to the STS via the core network unit, requesting to leave the session.

1003~4004: The STS disconnect the session with the peer user.

After the STS receives the SIP BYE request, the STS returns an SIP 200 OK response to the peer user. The response is sent to the peer user through the core network unit. The peer user leaves the session.

1005~1006: All the terminals terminate the session.

The STS sends an SIP BYE request to the first terminal of the multi-terminal user and the second terminal of the multi-terminal user, requesting the first and the second terminals to leave the session. The SIP BYE request is sent to the first and the second terminals via the core network unit. After the first terminal and the second terminal return SIP 200 OK responses respectively, each of the terminals leaves the session. The multi-terminal session terminates.

The above embodiment describes a situation where the peer user actively requests to terminate the session. It is appreciated that a certain terminal of the multi-terminal user may also request to terminate the session. The details are similar and are omitted herein for brevity.

The above description is an introduction of a situation where two users conduct a session. It is appreciated that it may also apply to a group session.

When the multi-terminal user joins a group session, connection between each terminal and the STS may be set up. The STS represents the multi-terminal user to join the group session and receive media messages from a conference center and distribute the media messages to a corresponding user terminal according to user configuration, or, receive the media messages from each terminal of the user and send them to the conference center.

II. Set Up an STS in the Process of a Session

The STS is not established when the multi-terminal user utilizes a terminal to start a session with other user. The STS is established only when a media needs to be added to another terminal or when the session is required to switch to another terminal. In the group session, the STS may be at a session server, or may be at a home server of the multi-terminal user.

Figure 11:
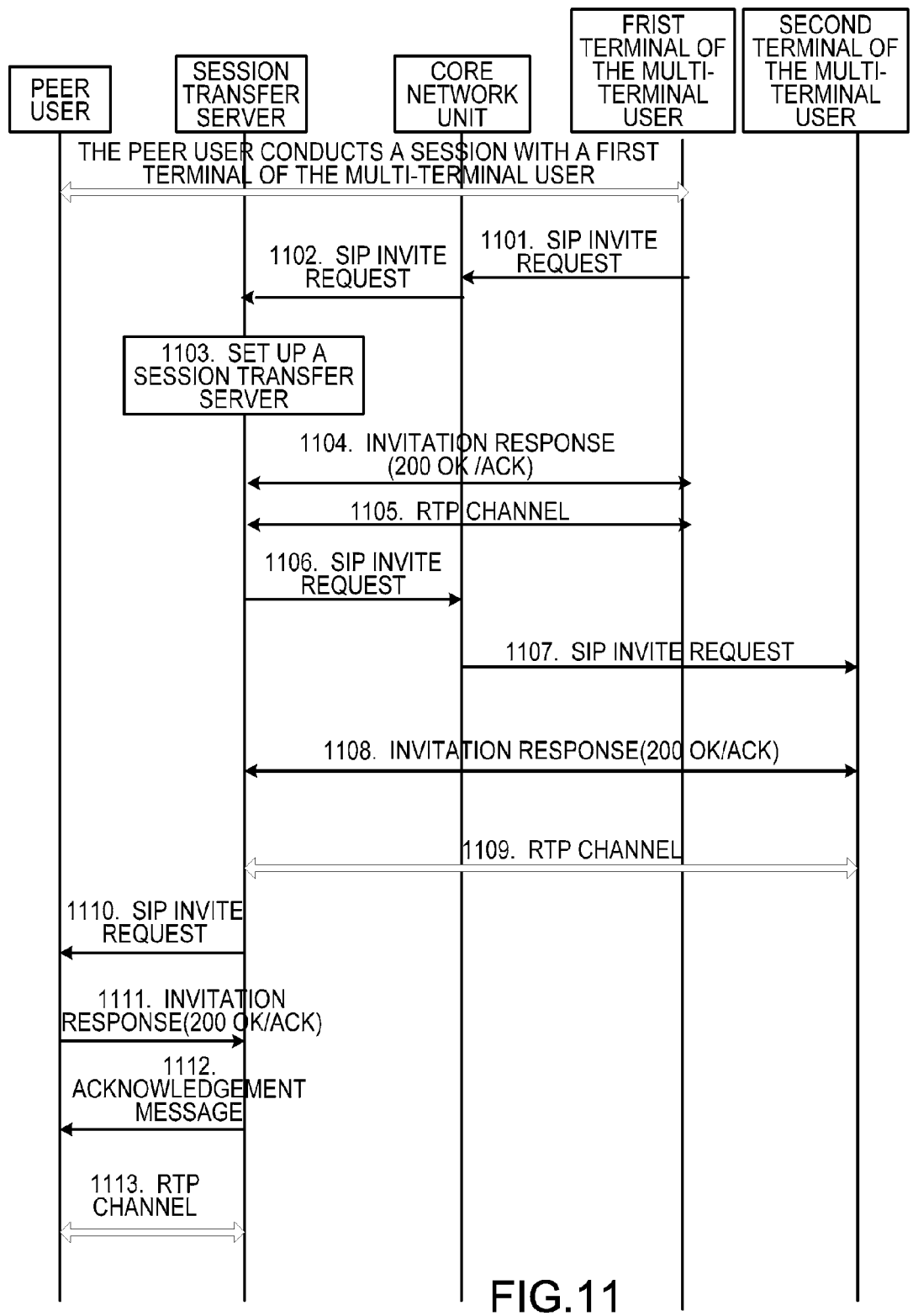
FIG. 11 is a flowchart according to a second embodiment of a method for multi-terminal session of the present invention.

Referring to FIG. 11, a second embodiment according to a method for multi-terminal session of the present invention includes the following steps.

1101~1102: An invitation request is initiated.

The first terminal of the multi-terminal user sends an SIP INVITE request to the home server of the first terminal. The request carries a GRUU of the second terminal to be invited.

The session ID is the ID of the session between the original peer user and the multi-terminal user. For instance, From: Bob<sip:bob@biloxi.example.com>gr=urn:uuid: f81d4fcc-7dec-11d0-a765-00a0c91e6cef>;tag=314159 wherein Bob <sip:bob@biloxi.example.com> is an ID of the first terminal of the multi-terminal user and f81d4fcc-7dec-11d0-a765-00a0c91e6cef is the GRUU of the second terminal of the multi-terminal user.

1103~1109: An STS and a media channel between the STS and the first terminal are set up.

After the server receives the SIP INVITE request, it is informed, according to the parameters contained in the request, that an STS needs to be generated on a service server and a new media type needs to be added to another terminal. Specifically, the server acquires the information from the following field.

<list>
<"sip:bob@biloxi.example.com; gr=urn:uuid:f8 1d4fae-7dec-11d0-a765-00a0c91e6bf6?method=INVITE?m=video/>
</list> where the media type to be added is video. The method adopted is INVITE manner.

STS is set up for the multi-terminal user. An SIP INVITE request is sent to the second terminal, inviting the second terminal to join the session with the peer user.

1110~1113: A media transport channel with the peer user is set up.

The STS sends the peer user an SIP INVITE request carrying a media type added by the multi-terminal user and sets up a media path in a B2BUA manner. That is, the STS puts its address into the media path in the SIP INVITE request. In other words, the STS represents the multi-terminal user to set up a connection with the peer user. The STS sets up connection with the first terminal and the second terminal.

Eventually, the media streams between the peer user and the multi-terminal user all go through the home server of the multi-terminal user. And, the media streams from the peer user are distributed, according to the user instruction, to a corresponding terminal, and the media from the first terminal and the second terminal of the multi-terminal user are delivered to the peer user.

After a new transport channel is set up, two identical RTP streams are set up at the same time within a certain period between the peer user and the first terminal of the multi-terminal user. One application of the peer user is that the peer user may just play one media stream after parsing the received data packets of the media streams. When a new media channel is set up, RTCP is used to disconnect the original RTP channel. After the new media path is set up, the first terminal of the multi-terminal user sends its media to both channels simultaneously. After receiving the original RTP channel release command, the first terminal only delivers the media content to the new media channel.

Figure 12:
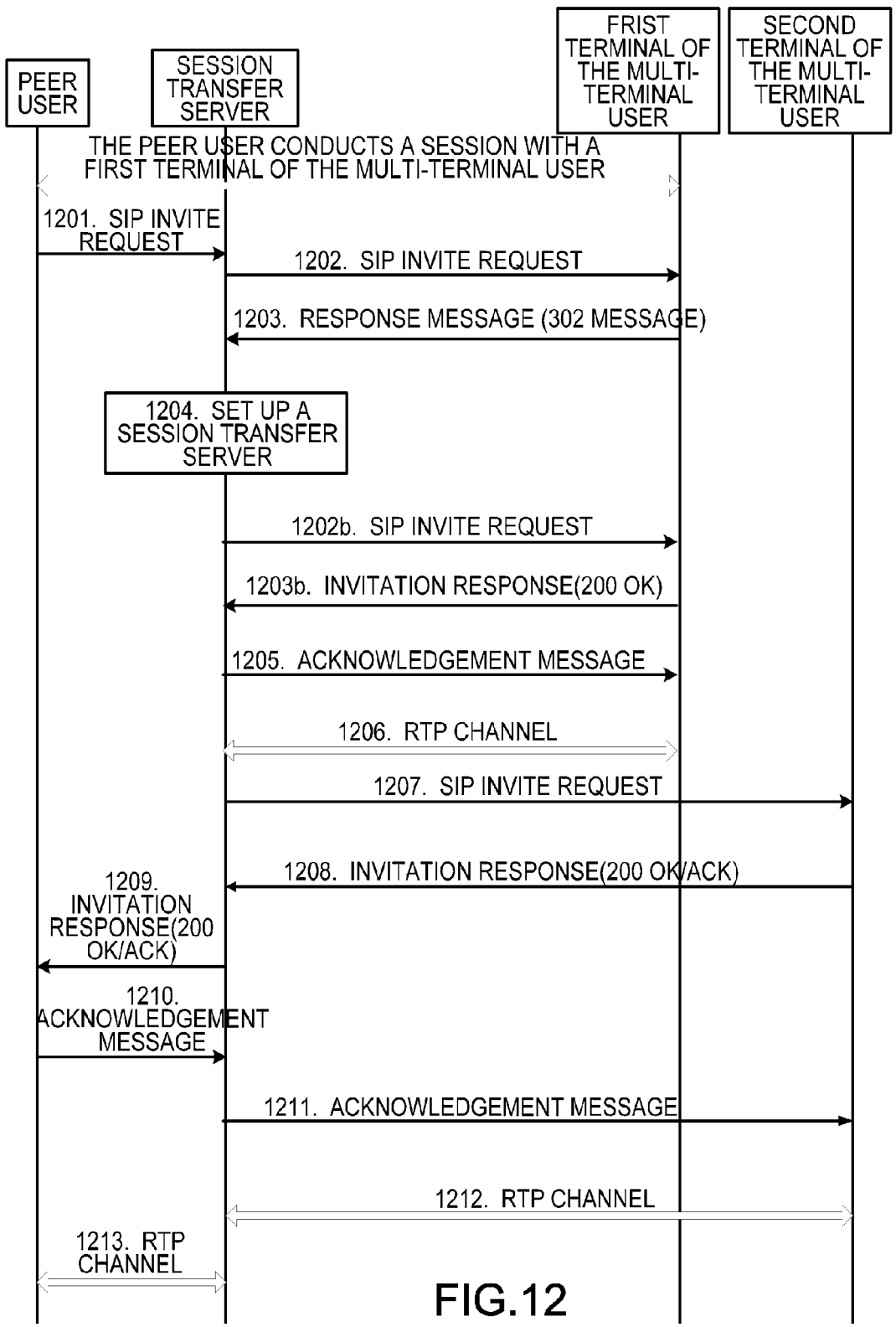
FIG. 12 is a flowchart of a media update procedure according to a second embodiment of a method for multi-terminal session of the present invention.

A media updating procedure is introduced based on the foregoing solutions. Referring to FIG. 12, the media updating procedure according to the second embodiment of a method for multi-terminal session of the present invention includes the following steps.

1201~1202: An SIP INVITE message is sent.

The peer user sends the SIP INVITE message to the first terminal of the multi-terminal user via a server.

1203: A 302 message is fed back.

The first terminal feeds back a 3XX message as a response and realizes a partial redirection function for the media. That is, the message instructs to add the new media type to the second terminal and remains the original media type in the first terminal.

1204: An STS is set up.

The server determines, based on the partially redirected GRUU address, that it is another terminal of the same URI. The server generates the STS for the multi-terminal user and records the media distribution policy.

With regard to the extended partial redirection function of 302 message, the 302 message may carry SDP content of the first terminal. As such, a transport channel is set up between the server and the first terminal. It is appreciated that other acknowledgement may also be used. For instance, 2XX acknowledgement may be used to indicate a partial extension. Then, the server feeds back the SIP ACK to complete the session negotiation with the first terminal and set up a connection channel.

1202b~1203b~1206, (an alternative solution without extending 302 message)

If the acknowledgement is not extended, then another INVITE request may be sent for negotiating the remaining media with the first terminal after the server receives the partial redirection acknowledgement. The CONTACT field of the INVITE request is replaced with the server IP in order to set up a media session channel with the first terminal.

1207~1208: The server sends an SIP INVITE request to the second terminal. The message body of the SIP INVITE request only carries the media type of SDP sent to the second terminal. At the same time, the requested CONTACT field is replaced with server IP. That is, a session between the second terminal and the peer user is set up in a B2BUA manner. The second terminal indicates in a response that the request is accepted.

Step 1205 indicates that the server combines the responses of the first terminal and the second terminal and feeds back an SIP 200 OK response to the peer user. As such, a session between the peer user and the multi-terminal user is set up in a B2BUA manner. In the response fed back, the CONTACT field uses the IP of the service server to replace the addresses of the first terminal and the second terminal.

Step 1209~1213: The peer user feeds back a response. After the server receives the response, the server sends an SIP ACK to the second terminal and sets up an RTP connection.

The function realized in the embodiment is that the user selects to add a new media type in the other terminal via a first terminal. It can be understood that the function can also be realized by another method. That is, the server may determine the capability of the first terminal. If the first terminal does not support the new media type, the server automatically sets up an STS for the multi-terminal user. And, the new media session invitation will be sent to other terminals of the multi-terminal user. After receiving positive acknowledgement from the other terminal, original media session invitation is sent to the first terminal. A session between the peer user and the multi-terminal user is set up in a B2BUA manner. If other terminal does not accept the request, the other terminal may send a response that it does not accept the session modification request.

The above description is an introduction of a situation where two users conduct a session. It is appreciated that it may also apply to a group session.

When the multi-terminal user joins the group session, connection between each terminal and the STS may be set up. The STS represents the multi-terminal user to join the group session and receives media messages from a conference center and distributes the media messages to a corresponding user terminal according to user configuration, or, receives the media messages from each terminal of the user and sends them to the conference center.

III. An STS is Set Up by a Call Initiator.

In this solution, when a peer user initiates a session with the multi-terminal user, the peer user may maintain the STS and handle the distribution of the media. The multi-terminal user joins the same session and uses the same session ID.

Figure 13:
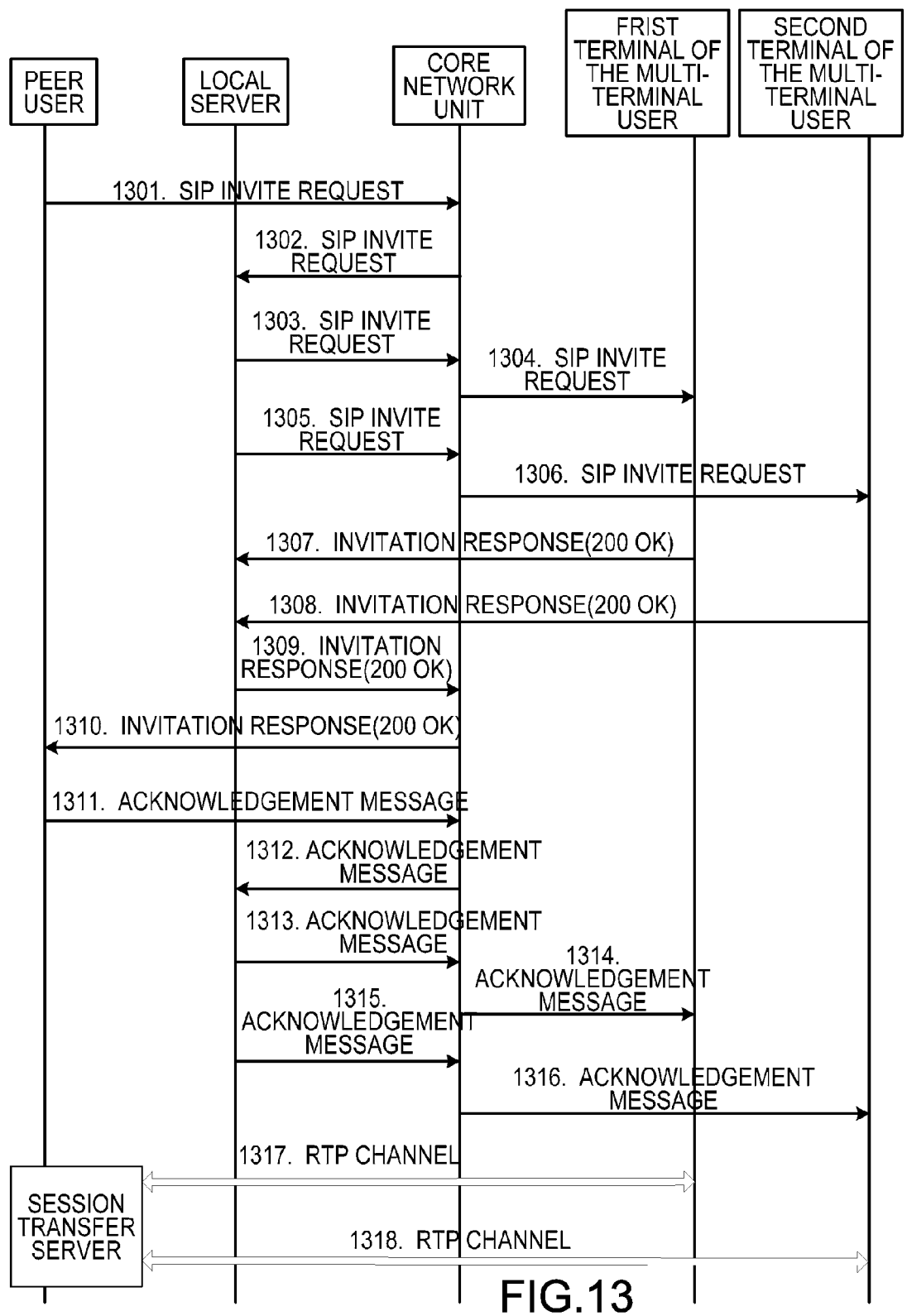
FIG. 13 is a flowchart according to a third embodiment of a method for multi-terminal session of the present invention.

Referring to FIG. 13, a third embodiment according to a method for multi-terminal session of the present invention includes the following steps.

1301~1306: An SIP INVITE message is sent.

The peer user sends an SIP INVITE message to the first terminal of the multi-terminal user and the second terminal of the multi-terminal user, inviting them to join the session.

1307~1310: A response message is fed back.

The first terminal of the multi-terminal user and the second terminal of the multi-terminal user feed back an SIP 200 OK message to the peer user via the core network unit so as to confirm that they join the session.

1311~1318: Media transport channels are set up.

The setup procedure is similar to the procedure of the foregoing embodiment and is omitted for brevity.

In the present embodiment, the peer user initiates a session request to the multi-terminal user. At the same time, two terminals of the multi-terminal user join the session simultaneously. The multi-terminal user selects different media type for different terminal. After the server incorporates the SDP negotiation request and sends to the peer user, the peer user generates and maintains STS. According to the media type negotiated with different terminals of the multi-terminal user, different media is sent to different terminal. The STS at the peer user integrates the media from the first terminal and the second terminal and presents the integrated media.

The terminal adding procedure and media updating procedure according to the present solution is similar to those described in the foregoing embodiment and is omitted herein for brevity.

According to the embodiments of the present invention, a connection between each terminal of the multi-terminal user and a session transfer server is first set up. A connection between the session transfer server and the peer user is set up. Then, each terminal of the multi-terminal user conducts a session with the peer user via the session transfer server. Consequently, the session transfer server represents the multi-terminal user to conduct a session with the peer user. Therefore, the peer user will not be notified when the multi-terminal user switches a terminal or adds a terminal. As such, there is no need to set up a session site, thus the continuity of the session is maintained and the user experience is improved.

The above description is an introduction of a situation where two users conduct a session. It is appreciated that it may also apply to a group session.

When the multi-terminal user joins the group session, connection between each terminal and the STS may be set up. The STS represents the multi-terminal user to join the group session and receive media messages from a conference center and distribute the media messages to a corresponding user terminal according to the user configuration, or, receive the media messages from each terminal of the user and send them to the conference center.

It is appreciated by those skilled in the art that the entire or partial steps in the above embodiments can be implemented with hardware when instructed by programs. Such programs may be stored in a computer or in a readable storage media. The storage media mentioned above may be a ROM, a magnetic disc or an optical disc, etc.

A method for a multi-terminal session, a communication system and a related device thereof are disclosed according to embodiments of the present invention. It is appreciated by those skilled in that art that any modification can be made to the embodiments and application fields without departing from the spirit of the present invention. Therefore, the specification herein shall not be construed as a limitation to the present invention.

What is claimed is:

1. A method for a multi-terminals session, comprising:
receiving by a session transfer server, a SIP INVITE request sent by a terminal of first user, and the SIP INVITE request received by a session transfer server comprises information of a second user;
determining by the session transfer server, a multi-terminals session which is configured by the second user based on the information of the second user, wherein the second user registers with the session transfer server at least a first terminal and a second terminal, wherein the first terminal and the second terminal are separate and distinct terminals;
forwarding by the session transfer server, the SIP INVITE request to the first terminal and the second terminal respectively, based on a configuration of the second user;
upon the first terminal and the second terminal receiving the SIP INVITE request, receiving by the session transfer server, respective first and second session acknowledgement from the first terminal and from the second terminal, wherein the first session acknowledgement from the first terminal comprises a first media type supported by the first terminal, and the second session acknowledgement from the second terminal comprises a second media type supported by the second terminal;
based on the determined first media type or the second media type, obtaining by the session transfer server, at least one of the first media type and the second media type, as a media capability of the session transfer server in order to conduct media negotiation with the first user;
sending by the session transfer server, a third session acknowledgement to the first user, wherein the third session acknowledgement comprises an address of the session transfer server and the at least one of the first media type and the second media type in order to set up a server media transport channel between the session transfer server and the first user; and
conducting by the session transfer server, a respective first and second media transport channel with the first terminal and the second terminal;
wherein the session transfer server representing the first and the second terminals as a multi-terminals user, conducting the multi-terminal session with the first user,
wherein the conducting of the multi-terminals session between each of the respective first and second terminals of the multi-terminal user with the first user comprising:
receiving by the session transfer server from the first user, a media message which comprises a requested media type content, afterwards, based on the first media type and the second media type:
determining by the session transfer server, a third terminal between the first terminal and the second terminal, wherein a third media type supported by the third terminal comprises at least a portion of the requested media type comprised in the media message;
sending the media message to the third terminal of the second user;

receiving respectively by the session transfer server, at least a first, a second and a third portions of the requested media type content of the media message from each of the first, second and third terminal of the second user, respectively; and sending by the session transfer server, the at least respective first, second and third portions of the requested media type content of the media message to the first user.

2. The method of claim 1, further comprising:

receiving by the session transfer server from the first terminal or the second terminal of the second user, a terminal join request for inviting the third terminal of the second user to join the multi-terminals session, wherein the terminal join request comprises the third media type supported by the third terminal;

sending by the session transfer server, an invitation request to the third terminal of the second user via a session initiation protocol message according to the terminal join request;

receiving by the session transfer server, an invitation acknowledgement from the third terminal of the second user.

3. The method of claim 2, further comprising:

receiving by the session transfer server, a media update request from the first user, wherein the media update request comprises a new media type to be used by the first user;

in case it is determined by the session transfer server, that the first the terminal or the second terminal cannot support the new media type; searching for another terminal of the second user which supports the new media type;

adding by the session transfer server, the another terminal which supports the new media type into the session via the multi-terminals session initialization protocol message;

sending by the session transfer server, the media message received from the first user to the another terminal which supports the new media type.

4. The method of claim 2, further comprising:

receiving by the session transfer server, a terminal removal request from the first terminal of the second user, wherein the terminal removal request comprises information of the second terminal, to remove the second terminal from the session;

sending by the session transfer server according to the terminal removal request, a session termination request to the second terminal of the second user via the session initialization protocol message; and receiving by the session transfer server, a session termination acknowledgement from the second terminal of the second user.

5. The method of claim 4, wherein after the second terminal of the multi-terminal user leaves the multi-terminals session, the method comprising:

updating according to the media type of the second terminal of the second user, by the session transfer server, the second media type of the session transfer server through the second media type which is supported only by the second terminal of the second user; and notifying by the transfer server, media types between the session transfer server and the first user to reduce the media types only to those supported by the second terminal.

6. The method of claim 2, further comprising:

receiving by the session transfer server, a terminal removal request from the first terminal of the second user, wherein the terminal removal request comprises information of the first terminal, to remove the first terminal from the session; and feeding back by the session transfer server according to the terminal removal request, a session removal acknowledgement to the first terminal of the second user via the session initialization protocol message.

7. The method of claim 1, further comprising:

sending by the third terminal, a join request to the second terminal or to the first terminal of the second user, wherein the join request comprises the third media type supported by the third terminal;

sending by one of the first terminal or the second terminal which receives the join request, a terminal join request to the session transfer server, and the terminal join request comprises the third media type supported by the third terminal; and feeding back via a session initialization protocol message by the session transfer server according to the terminal join request, a join acknowledgement to the one of the first terminal or the second terminal which receives the join request.

8. A session transfer server, comprising hardware which comprises a plurality of units, the plurality of units comprise:

a connection setup unit, which performs:

receiving by a session transfer server, a SIP INVITE request sent by a terminal of first user, and the SIP INVITE request received by a session transfer server comprises information of a second user;

determining by the session transfer server, a multi-terminal session which is configured by the second user based on the information of the second user, wherein the second user registers with the session transfer server at least a first terminal and a second terminal, wherein the first terminal and the second terminal are separate and distinct terminals;

forwarding by the session transfer server, the SIP INVITE request to the first terminal and the second terminal respectively, based on a configuration of the second user;

upon the first terminal and the second terminal receiving the SIP INVITE request, receiving by the session transfer server, respective first and second session acknowledgement from the first terminal and from the second terminal, wherein the first session acknowledgement from the first terminal comprises a first media type supported by the first terminal, and the second session acknowledgement from the second terminal comprises a second media type supported by the second terminal;

based on the determined first media type or the second media type, obtaining at least one of the first media type and the second media type as media capability of the session transfer server in order to conduct media negotiation with first user;

a channel setup unit, which performs:

setting up a respective first and second media transport channel with the first terminal and the second terminal, in communication with the first user by sending a third session acknowledgement to the first user, wherein the third session acknowledgement comprises an address of the session transfer server and the at least one of the first media type and the second media type in order to set up a first media transport channel between the session transfer server and the first user; and a session agent unit, which performs:
- receiving from the first user, a media message which comprises a requested media type content, afterwards, based on the first media type and the second media type:
  - determining by the session transfer server, a third terminal between the first terminal and the second terminal, wherein a third media type supported by the third terminal comprises at least a portion of the requested media type comprised in the media message;
  - sending the media message to the third terminal of the second user;
  - receiving respectively by the session transfer server, at least a first, a second and a third portions of the requested media type content of the media message from each of the first, second and third terminal of the second user, respectively; and
  - sending by the session transfer server, the at least respective first, second and third portions of the requested media type content of the media message to the first user.

* * * * *